United States Patent
Liang et al.

(10) Patent No.: US 11,881,770 B2
(45) Date of Patent: Jan. 23, 2024

(54) VOLTAGE CONVERTER WITH AVERAGE INPUT CURRENT CONTROL AND INPUT-TO-OUTPUT ISOLATION

(71) Applicant: TEXAS INSTRUMENTS INCORPORATED, Dallas, TX (US)

(72) Inventors: Jian Liang, Shanghai (CN); Yao Lu, Shanghai (CN); Chen Feng, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 30 days.

(21) Appl. No.: 17/563,255

(22) Filed: Dec. 28, 2021

(65) Prior Publication Data

US 2023/0208288 A1    Jun. 29, 2023

(51) Int. Cl.
  *H02M 3/156*    (2006.01)
  *H02M 3/155*    (2006.01)

(52) U.S. Cl.
  CPC .................. *H02M 3/155* (2013.01)

(58) Field of Classification Search
  CPC .................................................... H02M 3/155
  See application file for complete search history.

(56) References Cited

U.S. PATENT DOCUMENTS

| | | | |
|---|---|---|---|
| 7,394,633 B2* | 7/2008 | Sasitornwannakul | ....................... H02H 7/1213 361/82 |
| 10,778,099 B1* | 9/2020 | Womac | .................. H02M 1/32 |
| 10,784,849 B1* | 9/2020 | Hunter | ............. H03K 17/04123 |
| 2006/0176029 A1* | 8/2006 | McGinty | ................ H03K 17/74 323/222 |
| 2007/0216386 A1* | 9/2007 | Hagino | ............... H02M 3/1588 323/282 |

(Continued)

FOREIGN PATENT DOCUMENTS

| CN | 108574411 A | 9/2018 |
|---|---|---|
| JP | 2009081988 A | 4/2009 |

(Continued)

OTHER PUBLICATIONS

Kumar, Siddham et al. "A New Short-Circuit Protection Scheme for Boost Converter." IEEE, 2020.

(Continued)

*Primary Examiner* — Sisay G Tiku

(74) *Attorney, Agent, or Firm* — Michelle F. Murray; Frank D. Cimino

(57) ABSTRACT

A voltage converter having a voltage input and a voltage output, the voltage converter including a first and second transistors and an average current control circuit. The first transistor has a first control input, a first current terminal, and a second current terminal. The first current terminal is adapted to be coupled to a switch node. The second transistor has a second control input, a third current terminal, and a fourth current terminal. The third current terminal is adapted to be coupled to an inductor. The average current control circuit is coupled to the third current terminal and the fourth current terminal. The average current control circuit is configured to determine an average current level of (Continued)

current flowing through the second transistor and to control a voltage on the first control input of the first terminal based on the determined average current level.

19 Claims, 4 Drawing Sheets

(56) References Cited

U.S. PATENT DOCUMENTS

| | | | |
|---|---|---|---|
| 2010/0225240 A1 | 9/2010 | Shearer et al. | |
| 2010/0320992 A1* | 12/2010 | Dearn | H02M 3/1582 323/311 |
| 2012/0274153 A1* | 11/2012 | Maxwell | H02J 7/0036 307/126 |
| 2018/0074540 A1* | 3/2018 | Wakimoto | G05F 5/00 |
| 2019/0386561 A1* | 12/2019 | King | H02M 1/42 |
| 2023/0120432 A1* | 4/2023 | Womac | H03K 17/687 323/282 |

FOREIGN PATENT DOCUMENTS

| | | |
|---|---|---|
| JP | 2016158366 A | 9/2016 |
| KR | 1020210026102 A | 3/2021 |

OTHER PUBLICATIONS

Texas Instruments. "TPS61378-Q1 25-uA Quiscent Current Synchronous Boost Converter with Load Disconnect." SVLSET0D—May 2020—Revised Oct. 2021. pp. 1-36.

Xiao, Z. "An Instantaneously Triggered Short-Circuit Protection Architecture for Boost Switching DC/DC Converters." IEEE Transactions on Power Electronics, Vo. 33, No. 7, Jul. 2018. pp. 5677-5685.

MPS. "MP3428 17A, 600kH, 20V Wide Input Range, Synchronous Boost Converter in a small 3×4 QFN Package." Rev. 1.0, Oct. 10, 2019. pp. 1-20.

International Search Report dated May 3, 2023.
JP2009081988A, Machine translation.
JP2016158366A, Machine translation.
CN108574411A, Machine translation.
KR1020210026102A, Machine translation.

* cited by examiner

VOLTAGE CONVERTER WITH AVERAGE INPUT CURRENT CONTROL AND INPUT-TO-OUTPUT ISOLATION

BACKGROUND

Many types of voltage regulators are available. One type is a switching regulator in which the duty cycle of one or more switching transistors is controlled based on a feedback signal to regulator the output voltage of the regulator. One type of switching regulator is a boost converter which produces a regulated output voltage that is larger than its input voltage.

SUMMARY

In one example, A voltage converter having a voltage input and a voltage output, the voltage converter including a first and second transistors and an average current control circuit. The first transistor has a first control input, a first current terminal, and a second current terminal. The first current terminal is adapted to be coupled to a switch node. The second transistor has a second control input, a third current terminal, and a fourth current terminal. The third current terminal is adapted to be coupled to an inductor. The average current control circuit is coupled to the third current terminal and the fourth current terminal. The average current control circuit is configured to determine an average current level of current flowing through the second transistor and to control a voltage on the first control input of the first terminal based on the determined average current level.

DETAILED DESCRIPTION

A boost converter converts an input voltage to a higher output voltage. For some applications of a boost converter, the input power source to the boost converter has a relatively small input current limit. For example, some peripheral devices (e.g., barcode readers, cameras, etc.) receive their operating power from a universal serial bus (USB) Type-C cable. USB Type-C are capable of only relatively low power delivery to the peripheral device (e.g., 5V at 500 milliamperes (mA). For such limited input current power sources, it would be advantageous to control the average input current to make efficient use of the input current. Boost converters, whose control regulation circuits regulate the peak or valley input current, may not make efficient use of the full, yet limited, input current capability of the power source. The boost converter described herein has a control circuit that controls the average (DC) input current. The described boost converter also provides control for start-up or output short-circuit conditions.

Figure 1:
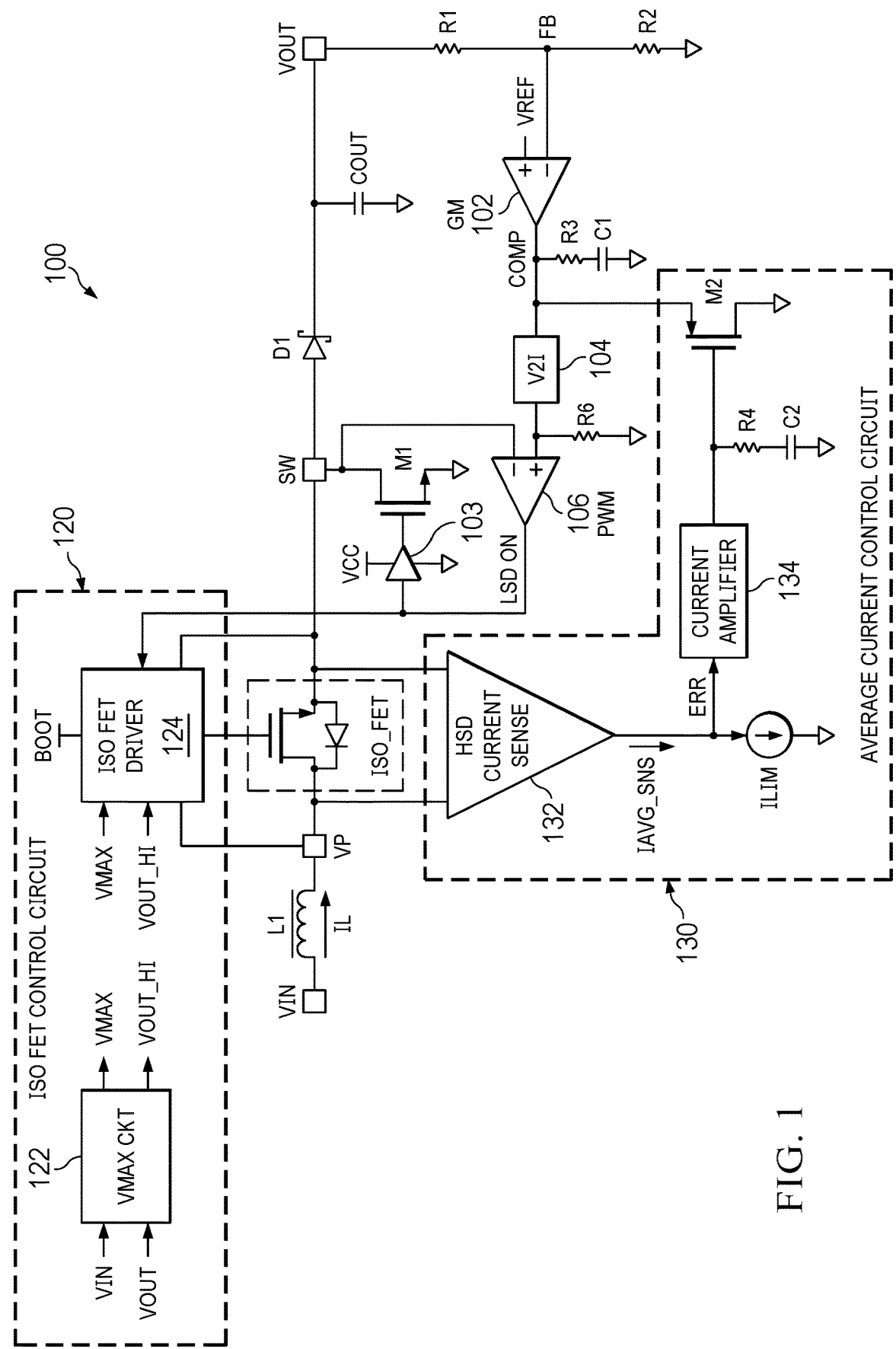
FIG. 1 is a schematic of a boost converter in accordance with an example.

FIG. 1 is a schematic of a boost converter 100 in accordance with an example. Boost converter 100 includes an input (VIN) and an output (VOUT). During operation, VOUT is larger than VIN. However, during start-up or if VOUT is shorted to ground, VOUT is smaller than VIN. The boost converter 100 includes an inductor L1, a switching transistor M1, and a Schottky diode D1). Current through the inductor L1 is labeled IL. The switching transistor M1 in this example is an N-type Metal Oxide Semiconductor Field Effect Transistor (NMOS transistor). When M1 is on, current IL flows through the inductor L1 and energy is stored in the inductor L1 in its magnetic field. When M1 is turned off, current IL decreases. The energy of the magnetic field also decreases to maintain the current flow towards VOUT (to which the load is coupled). The voltage polarity of the inductor reverses with M1 off and thus VIN is in series with the inductor's voltage and the two voltages add together to provide the larger VOUT voltage to charge the output capacitor Cout through the Schottky diode D1.

The boost converter 100 of FIG. 1 also includes an isolation transistor designated ISO_FET (e.g., an NMOS transistor) coupled between the inductor L1 and the Schottky diode D1. The connection node between the inductor L1 and the ISO_FET is labeled as VP, and the connection node between the ISO_FET and the Schottky diode D1 is labeled as the switch node (SW). The drain of M1 couples to SW and the source of M1 is couple to ground. When M1 is on, SW is pulled to approximately ground. When M1 is off, SW is pulled up to approximately VOUT.

The boost converter 100 further includes an ISO FET control circuit 120, an average current control circuit 130, a transconductance amplifier 102, a voltage-to-current (V2I) converter 104, and a PWM circuit 106. The ISO_FET control circuit 120 turns on the ISO_FET during normal operation, during which the ISO_FET operates in the linear region. Because the ISO_FET operates in the linear region, the ISO_FET represents a resistance between VP and SW, and thus functions as a sense resistor to produce a voltage between its drain and source that is proportional to IL. The average current control circuit 130 produces a current (IAVG_SNS) that is proportional to the average of IL and uses IAV_SNS to control the compensation (COMP) signal to the PWM circuit 106 to thereby control the duty cycle of M1. If the average level of IL increases, the average current control circuit 130 responds by decreasing the duty cycle of the PWM circuit 106 to cause the average level of IL to decrease. If the average level of IL decreases, the average current control circuit 130 responds by increasing the duty cycle of the PWM circuit 106 to cause the average level of IL to increase. The operation of the ISO FET control circuit 120 and the average current control circuit 130 is further explained below.

Resistors R1 and R2 are coupled in series between VOUT and ground and produce a scaled-down version of VOUT on feedback node FB to a negative input of the transconductance amplifier 102. The positive input of the transconductance amplifier is coupled to a reference voltage VREF. The output of the transconductance amplifier is the compensation signal COMP, which is converted to a current by V2I 104. The current from V2I 104 flows into a resistor R6, which converts the current to a voltage and which is coupled to the positive input of the PWM circuit 106. The negative input of the PWM circuit 106 is coupled to drain of M1. When M1 is on, current flows through M1 and, due to its drain-to-source resistance, a voltage (albeit relatively low) is produced on the drain of M1 that is proportional to the current through the inductor L1. Thus, the drain voltage of M1 is a current sense signal (ISNS).

The ISO FET control circuit 120 includes a VMAX circuit 122 coupled to an ISO FET driver 124. The VMAX circuit includes one or more comparators. The input signals to the VMAX circuit 122 are VIN and VOUT. The VMAX circuit 122 produces two output control signals—VMAX and VOUT_HI. VMAX is a voltage that is approximately equal to the larger of VIN and VOUT. That is, VMAX is approximately equal to VOUT during normal operation in which VOUT is larger than VIN, and VMAX is approximately equal to VIN during start-up or VOUT short-circuit conditions (when VIN is larger than VOUT). VMAX and VOUT_HI are provided to ISO FET driver 124. The control signal to turn on M1 is LSD_ON, and LSD_ON is also provided as input signal to the ISO FET driver 124. Further, both VP and SW are coupled to the ISO FET driver 124. An example implementation of the ISO FET driver 124 is shown in FIG. 2 and described in detail below.

Referring still to FIG. 1, the average current control circuit 130 includes a high side (HSD) current sense circuit 132, a current reference circuit ILIM ("ILIM" refers both to the current reference circuit as well as to the magnitude of the current it produces), a current amplifier 134, resistor R4, capacitor C2, and transistor M2. Transistor M2 in this example is a P-type Metal Oxide Semiconductor Field Effect Transistor (PMOS transistor). The output of the HSD current circuit 132 is a current IAVG_SNS that is proportional to the average IL current. If the input current to the current amplifier 134 is labeled ERR. If IAVG_SNS is larger than ILIM, then ERR is a positive current that is the difference between IAVG_SNS and ILIM that flows into the current amplifier 134. If IAVG_SNS is smaller than ILIM, then ERR flows in the opposite direction (i.e., from the current amplifier 134 through ILIM to ground), and the sum of ERR and IAVG_SNS equals ILIM in this state. The current amplifier 134 is an inverting current amplifier the output of which controls the gate of M2. When the average IL current increases, the voltage on the gate of M2 decreases further turning M2 harder and pulling COMP lower to decrease the duty cycle of M1 and thus decrease IL. When the average IL current decreases, the voltage on the gate of M2 also increases further turning M2 off and allowing COMP to increase the duty cycle of M1 and thus increase IL.

Figure 2:
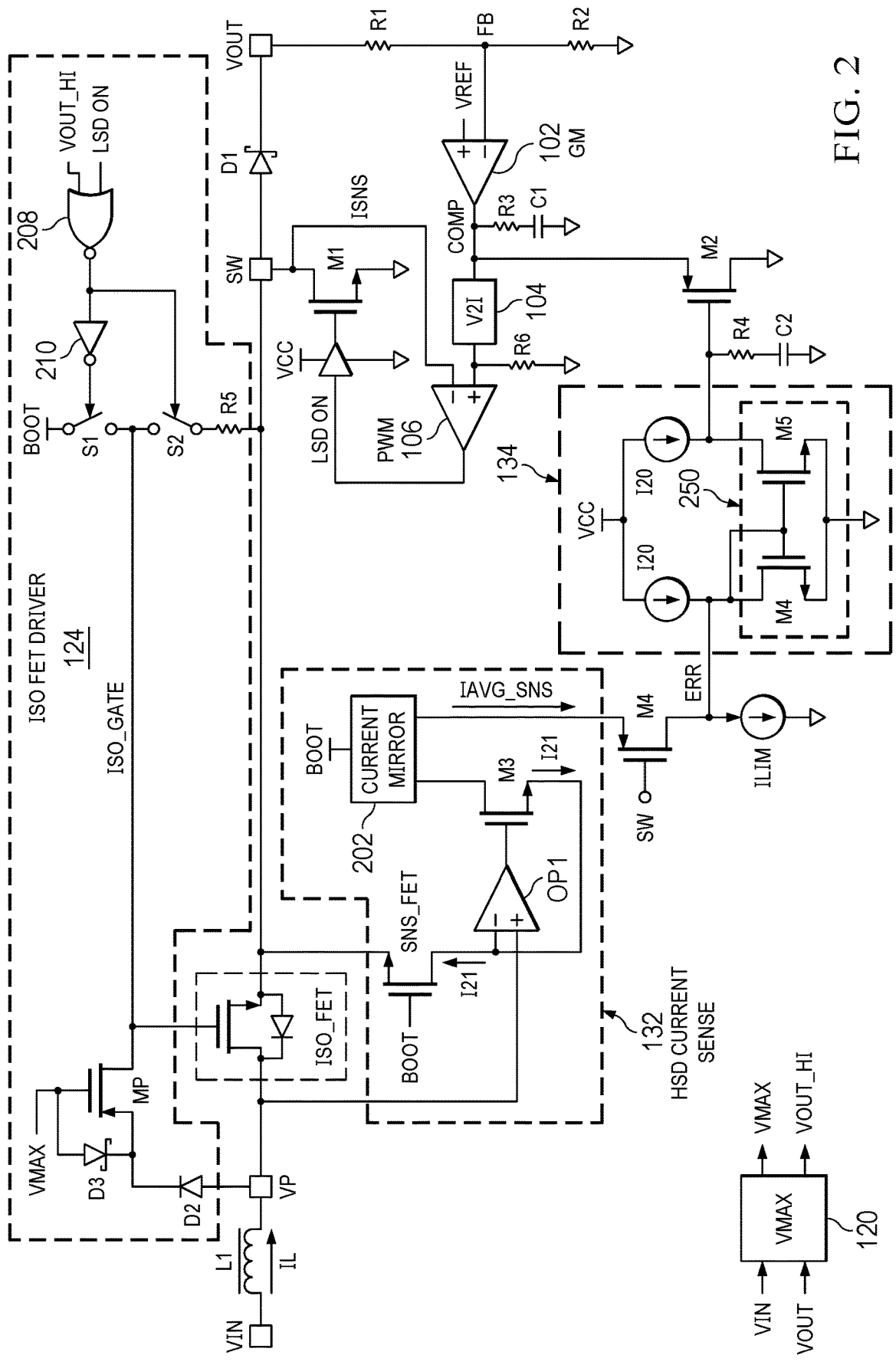
FIG. 2 is a more detailed schematic of the boost converter of FIG. 1 in accordance with an example.

Referring to the more detailed schematic of FIG. 2, the ISO FET driver 124 includes a diode D2, a Zener diode Z2, a PMOS transistor MP, switches S1 and S2 (both of which are transistors), a NOR gate 208, and an inverter 210. VOUT_HI is coupled to one input of inverter 208 and LSD_ON is coupled to the other inverter input. The output of NOR gate 208 is coupled to and controls the on/off state of S2. The output of NOR gate 208 is coupled to the input of inverter 210, and the output of inverter 210 is coupled to and controls the on/off state of S1. Accordingly, when S1 is on, S2 is off, and when S2 is on, S1 is off.

When on (closed), S1 couples a boot strap voltage BOOT to the gate of the ISO_FET. BOOT is generated by bootstrap circuit (not shown) and is a predefined voltage above the voltage of SW. In one example, BOOT is 5V greater than SW. The source of the ISO_FET is coupled to SW. When S1 is turned on, the gate-to-source voltage (Vgs) of the ISO_FET is the BOOT voltage. In the example in which BOOT is SW+5V, the Vgs of the ISO_FET is 5V when S1 is on.

VMAX 122 forces VOUT_HI to be logic "1" responsive to VOUT being greater than VIN (normal boost operation). With one input of NOR gate being logic "1", the output of NOR gate is logic "0" thereby turning off S2. The logic 0 from NOR gate 208, however, is inverted to a logic 1 by inverter 210 thereby turning on S1. ISO_FET is on and operating in the linear region, and functions as a current sense resistance to sense the inductor current (IL).

Referring still to FIG. 2, the HSD current sense circuit 132 includes a sense transistor (SNS_FET), an operational amplifier OP1, an NMOS transistor M3, and a current mirror 202. Current mirror 202 includes, for example, a pair of PMOS transistors configured to function as a current mirror. The current that flows through M3 is mirrored as IAVG_SNS through M4 to ILIM and the current amplifier 134.

The source of SNS_FET is coupled to SW and to the BOOT voltage. The source of the SNS_FET is coupled to the source of the ISO FET and to SW. The inverting (−) input of OP1 is coupled to the drain of the SNS_FET, and the non-inverting (+) input of OP1 is coupled to the drain of the ISO_FET. The drain of the ISO_FET is coupled to node VP. Because the voltage difference between the inverting and non-inverting inputs of an operational amplifier is approximately 0V, the drain of the SNS_FET is approximately equal to VP as well. When M1 is on, the ISO_FET operates in the linear region as noted above. The SNS_FET also operates in the linear region. The SNS_FET is a smaller transistor (size referring to the ratio of channel width (W) to channel length (L)). With their sources, drains, and gates having the same voltages, the current through the SNS_FET is proportional to, but smaller than, the current through the ISO_FET (IL). The current through the SNS_FET is labeled as I21 in FIG. 2. The current mirror 202 provides the current I21 through M3 and through the SNSN_FET to SW.

The current mirror 202 also mirrors I21 as IAVG_SNS through M4 to ILIM/current amplifier 134. The current amplifier 134 includes a current mirror 250 formed by the two NMOS transistors M4 and M5. Current sources 120 provide, in one embodiment, the same current. If IAVG_SNS is greater than ILIM, the excess current (the difference between IAVG_SNS and ILIM) flows into drain of M4 along with I20. In one embodiment, the mirror ratio of current mirror 250 is 1:1, and thus the current that flows through M4 also flows thorough M5. Accordingly, if IAVG_SNS is greater than ILIM, the drain current of M5 is larger than I20 and thus current flows from the gate of M2 thereby discharging gate of M2, which pulls COMP lower. Reciprocally, if IAVG_SNS is smaller than ILIM, the drain current of M5 is smaller than I20 and the excess current (I20 less the drain current of M5) flows into the gate of M2 thereby charging its gate and transitioning M2 closer to the fully off state and thereby allowing COMP to increase.

Figure 3:
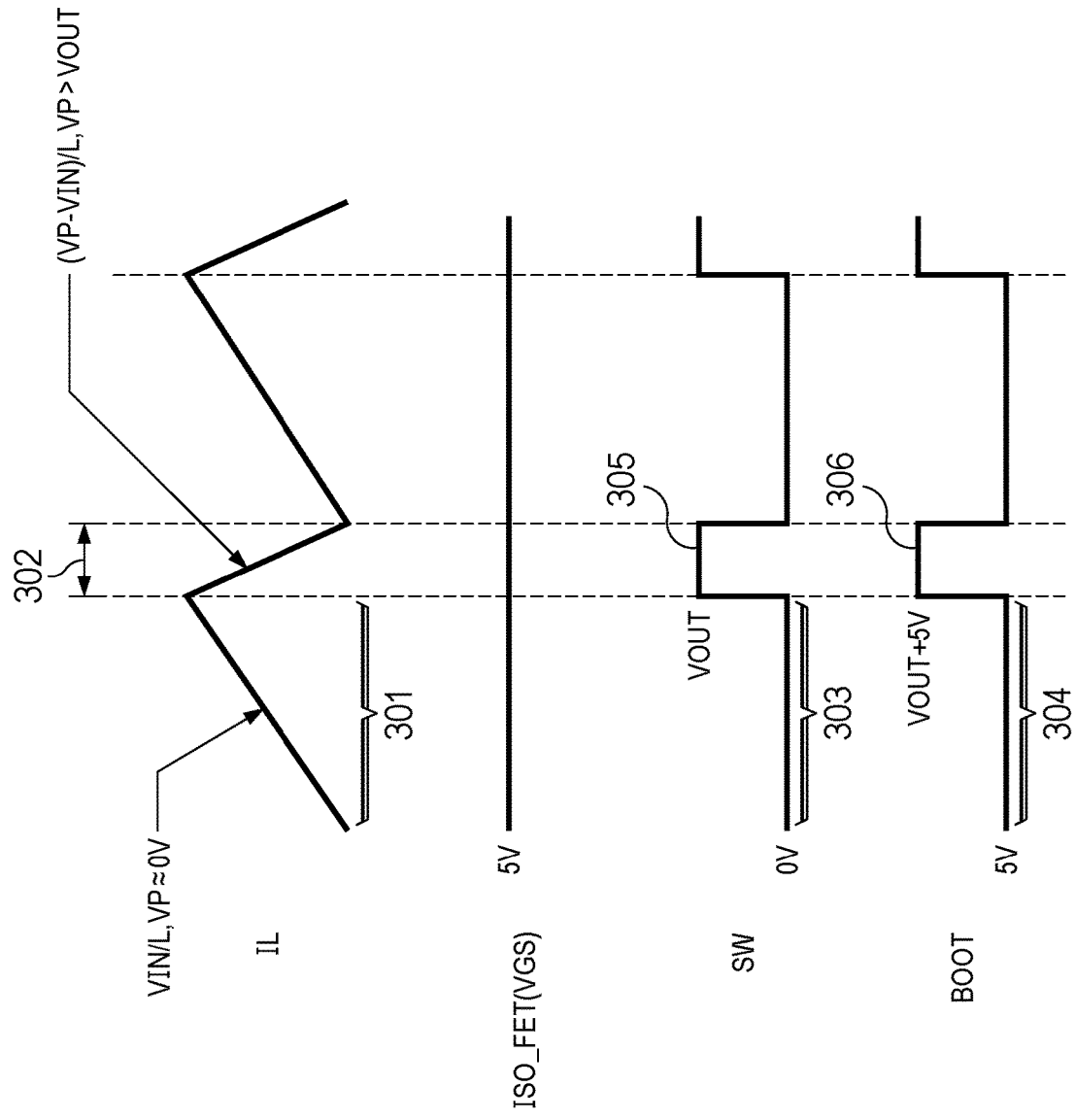
FIG. 3 is a timing diagram illustrating the operation of the boost converter during normal operation (when the output voltage is larger than the input voltage) in accordance with an example.

FIG. 3 is a timing diagram illustrating the operation of boost converter during normal operation in which VOUT is greater than VIN. The timing diagram includes sample waveforms for inductor current IL, the Vgs of the ISO_FET, the voltage of SW, and the BOOT voltage. When M1 is on, the inductor current IL increases as shown at 301. In one example, the BOOT voltage is 5V greater than the SW voltage, and thus the Vgs of the ISO_FET is 5V regardless as to whether M1 is on or off. With M1 being on, the SW voltage is approximately 0 V (as shown at 303) and thus the BOOT voltage is approximately 5V as shown at 304. When M1 is off, IL decreases as shown at 302, the SW voltage jumps up to approximately VOUT as shown at 305, and thus the BOOT voltage increases to VOUT plus 5V as shown at 306.

During a start-up process, VIN will be greater than VOUT. VIN will also be larger than VOUT if VOUT were to be shorted to ground. Responsive to VIN being greater than VOUT, VMAX 122 forces VOUT_HI to be logic 0. With VOUT_HI being a 0, the output of NOR gate 208 is the logical inverse of LSD_ON. LSD_ON being a 1 causes M1 to turn on, and LSD_ON being a 0 causes M1 to turn off. Thus, when M1 is on (LSD_ON is a 1), the output of NOR gate 208 is a 0, which causes S2 to be off and, via inverter 210, S1 to be on. Alternatively stated, when M1 is on, S1 also is on thereby coupling the BOOT voltage to the gate of the ISO_FET. Reciprocally, when M1 is off (LSD_ON is a 0) when VIN is greater than VOUT, the output of NOR gate 208 is a 1, which causes S2 to be on and S1 to be off. Alternatively stated, when M1 is off, S2 is on (and S1 is off) and the gate of the ISO_FET is coupled through resistor R5 to SW. A control loop is created in this configuration to control the gate voltage of the ISO_FET to cause the ISO_FET to operate in the saturation region with a Vgs that regulates the current through the ISO_FET to approximately equal IL (which decreases when M1 is off). This control loop is further described below.

When VIN is greater than VOUT, VOUT_HI is 0, and the control loop operates according to two phases. One phase is when M1 is on (LSD_ON is 1). The other phase is when M1 is off (LSD_ON is 0), and is described below. When M1 is on, SW is approximately equal to ground, LSD_ON is 1, and the output of NOR gate 208 is 0. As a result, S2 is off and S1 is on. With S1 being on, the BOOT voltage is coupled to the gate of the ISO_FET.

When M1 is off, LSD_ON is 0. With both VOUT_HI and LSD_ON being 0, the output of NOR gate is a 1, which closes S2, and via inverter 210, opens S1. In this configuration, the gate of the ISO_FET is coupled to SW via resistor R5. The gate of MP is VMAX (the larger of VIN or VOUT). With VIN being greater than VOUT, VMAX is VIN and thus the gate of MP is VIN. The Vgs voltage of the ISO_FET decreases with the resistance of R5 as the load, so the drain-to-source on-resistance of the ISO_FET increases. The VP voltage will increase if the inductor current is not changed (the loop response is fast and thus the inductor current is generally unchanged). Once the VP voltage increases to higher than VIN by the sum of the forward voltage drop of diode D2 and the Vgs of MP, the MP transistor begins conducting and the source current flows through R5 to pull up the Vgs of the ISO_FET. Accordingly, a negative feedback loop is formed by the combination of MP, R5 and the ISO_FET. VP is approximately equal to the voltage on the gate of MP (VIN) plus the Vgs of MP plus the forward voltage drop across diode D2. The ISO_FET operates in the saturation region with a Vgs in the range of approximately 1 to 2 V.

Figure 4:
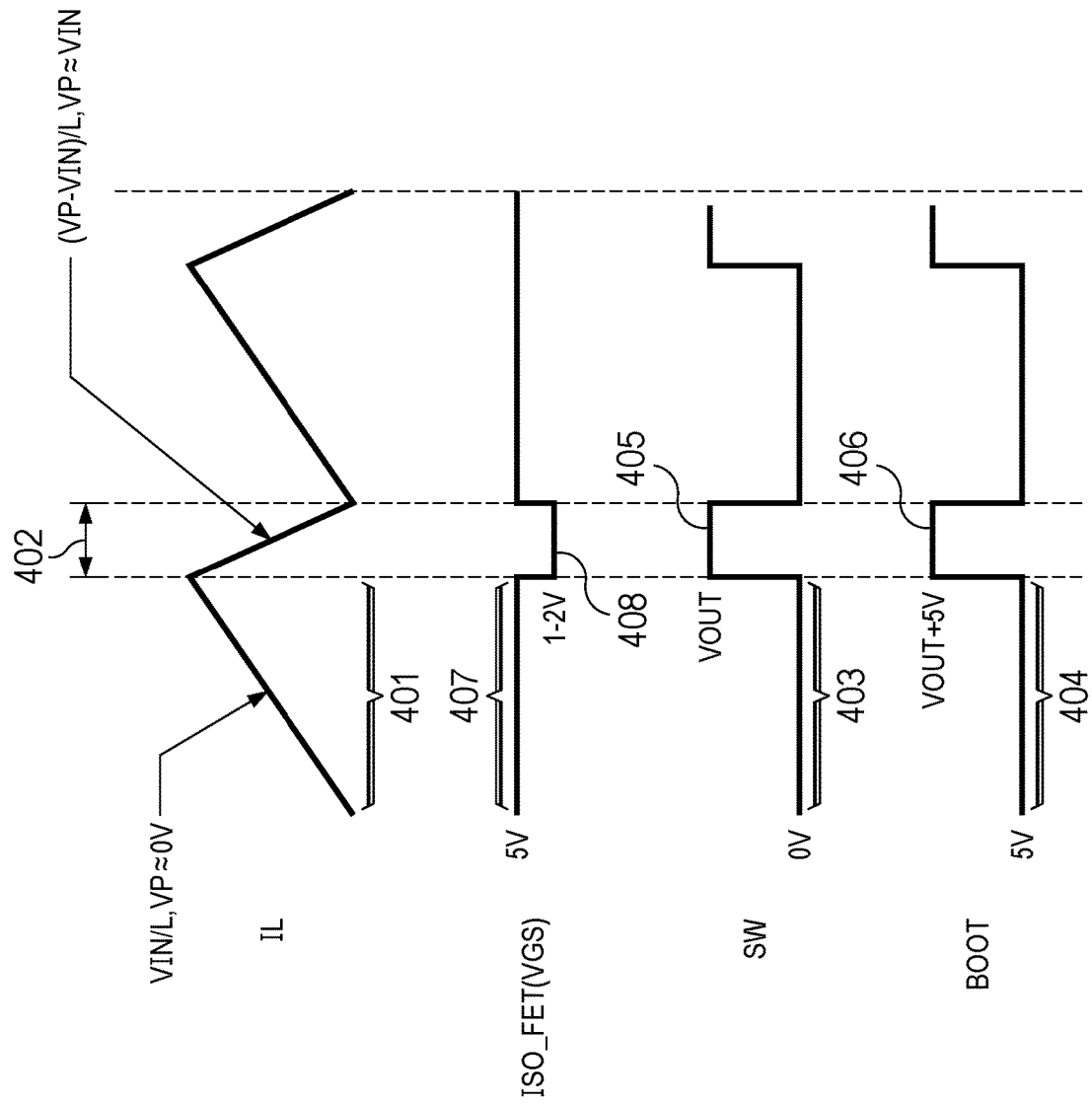
FIG. 4 is a timing diagram illustrating the operation of the boost converter during startup or during an output short-circuit condition (when the output voltage is smaller than the input voltage) in accordance with an example.

FIG. 4 is a timing diagram illustrating the operation of boost converter during operation in which VOUT is smaller than VIN. The timing diagram includes sample waveforms for inductor current IL, the Vgs of the ISO_FET, the voltage of SW, and the BOOT voltage. When M1 is on, the inductor current IL increases as shown at 401. In the example discussed above, the BOOT voltage is 5V greater than the SW voltage. With M1 being on, the SW voltage is approximately 0 V (as shown at 403) and thus the BOOT voltage is approximately 5V as shown at 404. When M1 is off, S1 is off and S2 is on as explained above. IL decreases as shown at 402. The SW voltage jumps up to approximately VOUT as shown at 405, and thus the BOOT voltage increases to VOUT plus 5V as shown at 406. The Vgs of the ISO_FET is approximately equal to 5V when M1 is on and S1 is closed as shown at 407 but decreases to 1-2V as shown at 408 as controlled by the control loop described above.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A voltage converter having a voltage input and a voltage output, the voltage converter comprising:
   an inductor having a first terminal coupled to the voltage input, the inductor having a second terminal;
   a first transistor having a first control input, a first current terminal, and a second current terminal;
   a second transistor having a second control input, a third current terminal, and a fourth current terminal, the third current terminal coupled to the second terminal of the inductor; and
   an average current control circuit coupled to the third current terminal and the fourth current terminal, the average current control circuit configured to determine an average current level of current flowing through the second transistor and to control a voltage on the first control input of the first transistor based on the determined average current level, wherein the average current control circuit includes a current sense circuit having first and second current sense circuit inputs, the first current sense circuit input coupled to the third current terminal, and the second current sense circuit input coupled to the fourth current terminal.

2. The voltage converter of claim 1, further including:
   a current amplifier having input coupled to an output of the current sense circuit; and
   a third transistor having a third control input, a fifth current terminal, and a sixth current terminal, wherein a voltage on the fifth current terminal is configured to control the voltage on the first control input.

3. The voltage converter of claim 2, in which the current amplifier is an inverting current amplifier.

4. The voltage converter of claim 1, in which the average current control circuit includes:
   a third transistor having a third control input, a fifth current terminal, and a sixth current terminal, the fifth current terminal is coupled to the fourth current terminal; and
   an operational amplifier (OP AMP) having a first OP AMP input and a second OP AMP input, the first OP AMP input coupled to the sixth current terminal, and the second OP AMP input coupled to the third current terminal.

5. The voltage converter of claim 1, further including a transistor driver, the transistor driver comprising:
   a first transistor driver voltage terminal, a second transistor driver voltage terminal, a first transistor driver control input, a second transistor driver control input, and a transistor driver output;
   the first transistor driver voltage terminal coupled to the third current terminal;
   the second transistor driver voltage terminal coupled to the fourth current terminal; and
   the transistor driver output coupled to the second control input.

6. The voltage converter of claim 5, further including a control circuit having a first control circuit output and a second control circuit output, the first control circuit output coupled to the first transistor driver control input, and the second control circuit output coupled to the second transistor driver control input, the control circuit configured to:
   generate a voltage on the first control circuit output equal to the larger of the voltage on the voltage input and the voltage output; and
   generate a digital control signal on the second control circuit output indicative of which of the voltage input and voltage output has a larger voltage.

7. The voltage converter of claim 6, in which the transistor driver includes:
   a logic circuit having an input being the second transistor driver control input;
   a third transistor having a third control input, a fifth current terminal, and a sixth current terminal, the sixth current terminal providing the transistor driver output coupled to the second current terminal, the third control input being the first transistor driver control input;
   a first switch coupled to the logic circuit and configured to switch a boot voltage to the second control input in response to a first signal from the logic circuit; and
   a second switch coupled to the logic circuit and configured to couple the boot voltage to the fourth current terminal in response to a second signal from the logic circuit.

8. The voltage converter of claim 7, in which the logic circuit includes a logic gate having a first logic gate input and a second logic gate input, the first logic gate input being the second transistor driver control input, and the second logic gate input coupled to the first control input.

9. The voltage converter of claim 1, in which the voltage converter is a boost converter.

10. A voltage converter having a voltage input and a voltage output, the voltage converter comprising:
    a first transistor having a first control input, a first current terminal, and a second current terminal;
    a second transistor having a second control input, a third current terminal, and a fourth current terminal, the third current terminal adapted to be coupled to an inductor; and
    an average current control circuit coupled to the third current terminal and the fourth current terminal, the average current control circuit configured to determine an average current level of current flowing through the second transistor and to control a voltage on the first control input of the first transistor based on the determined average current level, wherein the average current control circuit includes a current sense circuit having first and second current sense circuit inputs, the first current sense circuit input coupled to the third current terminal, and the second current sense circuit input coupled to the fourth current terminal.

11. The voltage converter of claim 10, further including:
    a current amplifier having input coupled to an output of the current sense circuit; and
    a third transistor having a third control input, a fifth current terminal, and a sixth current terminal, wherein a voltage on the fifth current terminal is configured to control the voltage on the first control input.

12. The voltage converter of claim 10, in which the average current control circuit includes:
    a third transistor having a third control input, a fifth current terminal, and a sixth current terminal, the fifth current terminal is coupled to the fourth current terminal; and
    an operational amplifier (OP AMP) having a first OP AMP input and a second OP AMP input, the first OP AMP input coupled to the sixth current terminal, and the second OP AMP input coupled to the third current terminal.

13. The voltage converter of claim 10, further including a transistor driver, the transistor driver comprising:
    a first transistor driver voltage terminal, a second transistor driver voltage terminal, a first transistor driver control input, a second transistor driver control input, and a transistor driver output;

the first transistor driver voltage terminal coupled to the third current terminal;

the second transistor driver voltage terminal coupled to the fourth current terminal; and the transistor driver output coupled to the second control input.

14. The voltage converter of claim 10, further including:

a first logic gate having an output;

a second logic gate having an input coupled to the output of the first logic gate;

a first switch having a control input coupled to the output of the second logic gate; and a second switch having a control input coupled to an output of the first logic gate;

when closed, the first switch configured to couple a voltage to the second control input of the second transistor; and when closed, the second switch configured to couple the voltage to the fourth current terminal of the second transistor.

15. A boost converter having a converter input and a converter output, the boost converter comprising:

an inductor having a first terminal coupled to the converter input, the inductor having a second terminal;

a first transistor having a first control input, a first current terminal, and a second current terminal;

an isolation transistor having a second control input, a third current terminal, and a fourth current terminal, the third current terminal coupled to the second terminal of the inductor;

an average current control circuit coupled to the third current terminal and the fourth current terminal, the average current control circuit configured to determine an average current level of current flowing through the isolation transistor and to control a voltage on the first control input of the first terminal based on the determined average current level; and an isolation transistor driver having first transistor driver voltage terminal, a second transistor driver voltage terminal, a first transistor driver control input, a second transistor driver control input, and a transistor driver output coupled to the second control input, the first transistor driver voltage terminal coupled to the third current terminal, and the second transistor driver voltage terminal coupled to the fourth current terminal.

16. The boost converter of claim 15, in which the average current control circuit includes a current sense circuit coupled to a current amplifier.

17. The boost converter of claim 16, in which the current amplifier has an output, and the boost converter further includes a transconductance amplifier having an output, and the output of the current amplifier is coupled to the output of the transconductance amplifier.

18. The boost converter of claim 15, in which, responsive to a voltage on the converter input being smaller than a voltage on the converter output, the isolation transistor driver has a first mode of operation when the first transistor is on, and a second mode of operation when the first transistor is off, the first mode of operation causes the isolation transistor driver to turn on the isolation transistor, and the second mode of operation causes the isolation transistor driver to regulate a voltage on the second control input of the isolation transistor based on a voltage on the third current terminal.

19. The boost converter of claim 15, in which the isolation transistor is an N-type metal oxide semiconductor field effect transistor.

* * * * *